(12) United States Patent
Jeffrey et al.

(10) Patent No.: US 7,469,068 B2
(45) Date of Patent: Dec. 23, 2008

(54) METHOD AND APPARATUS FOR DIMENSIONALLY TRANSFORMING AN IMAGE WITHOUT A LINE BUFFER

(75) Inventors: Eric Jeffrey, Richmond (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 941 days.

(21) Appl. No.: 10/855,670

(22) Filed: May 27, 2004

(65) Prior Publication Data

US 2005/0276511 A1 Dec. 15, 2005

(51) Int. Cl.
*G06K 9/32* (2006.01)
*G06K 9/36* (2006.01)
*G06K 9/46* (2006.01)
*G06K 1/00* (2006.01)
*G06K 15/02* (2006.01)
*G06F 15/00* (2006.01)
*H04N 1/393* (2006.01)

(52) U.S. Cl. .................. 382/235; 382/299; 358/1.2; 358/451

(58) Field of Classification Search ......... 382/298–299, 382/235; 358/1.2, 451
See application file for complete search history.

(56) References Cited

U.S. PATENT DOCUMENTS 5,020,115 A * 5/1991 Black .................... 382/298
6,151,074 A 11/2000 Werner
6,480,302 B1 * 11/2002 Kawano .................. 358/2.1
6,529,935 B1 3/2003 MacInnis et al.
2002/0186323 A1 * 12/2002 Sacca ..................... 348/488

FOREIGN PATENT DOCUMENTS

| JP | 05219358 | 8/1993 |
| JP | 07143397 | 6/1995 |
| JP | 08032872 | 2/1996 |
| JP | 08241066 | 9/1996 |
| WO | WO 02/23889 A2 | 3/2002 |

OTHER PUBLICATIONS

Feng and Jiang, "Image Spatial Transformation in DCT Domain", 2001 International Conference on Image Processing, IEEE Oct. 10, 2001.*

* cited by examiner

*Primary Examiner*—Brian Q Le
*Assistant Examiner*—Nathan Bloom
(74) *Attorney, Agent, or Firm*—Mark P. Watson

(57) ABSTRACT

The invention is directed to a method and apparatus for serially receiving and dimensionally transforming an image in an ordered sequence of interleaved blocks. Each block comprises an ordered sequence of samples of the image, and the samples of a single block all corresponding to a single color component. The method includes steps of counting the samples in the order received to determine a sequence number for each sample, comparing the sequence number with a set of predetermined values; and dimensionally transforming the image by either discarding the sample or storing the sample in a memory depending on the result of the comparison.

51 Claims, 9 Drawing Sheets

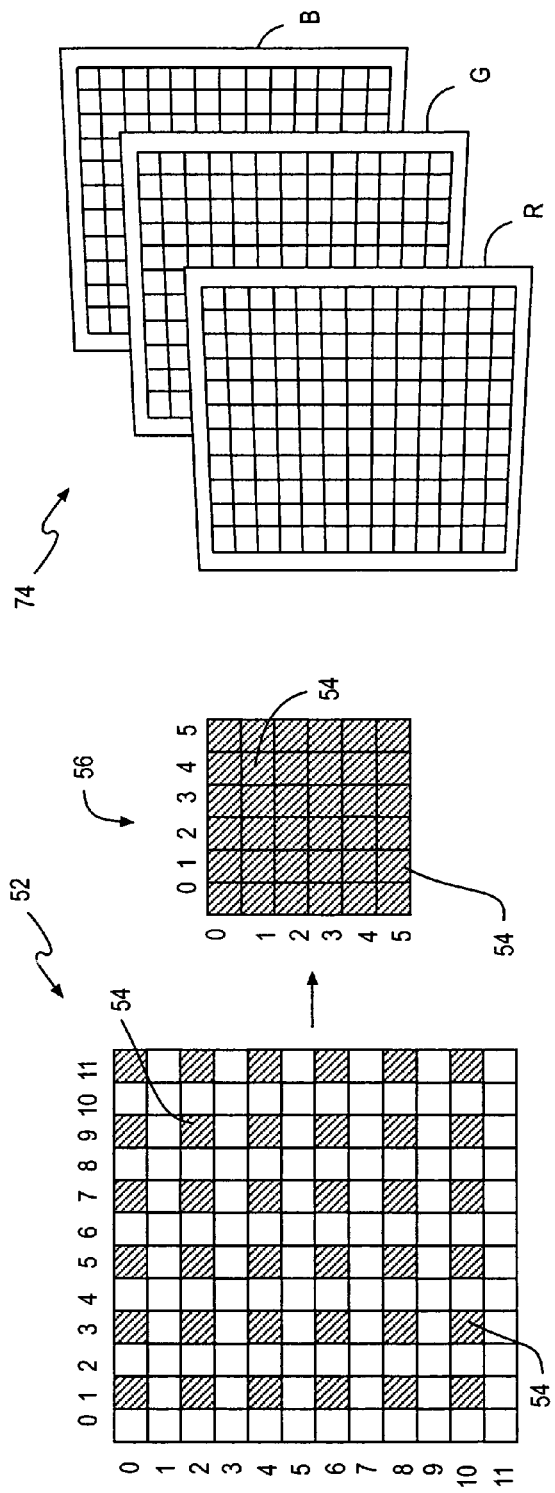
FIG. 3 (PRIOR ART)
FIG. 4 (PRIOR ART)
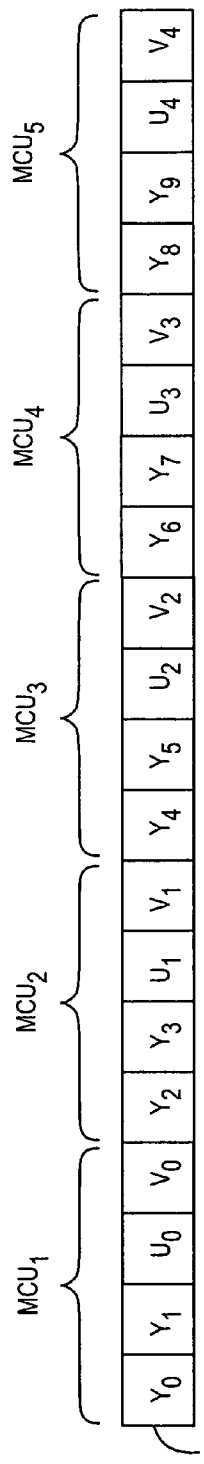
FIG. 9 (PRIOR ART)

4:1:1

4:4:4

4:2:2

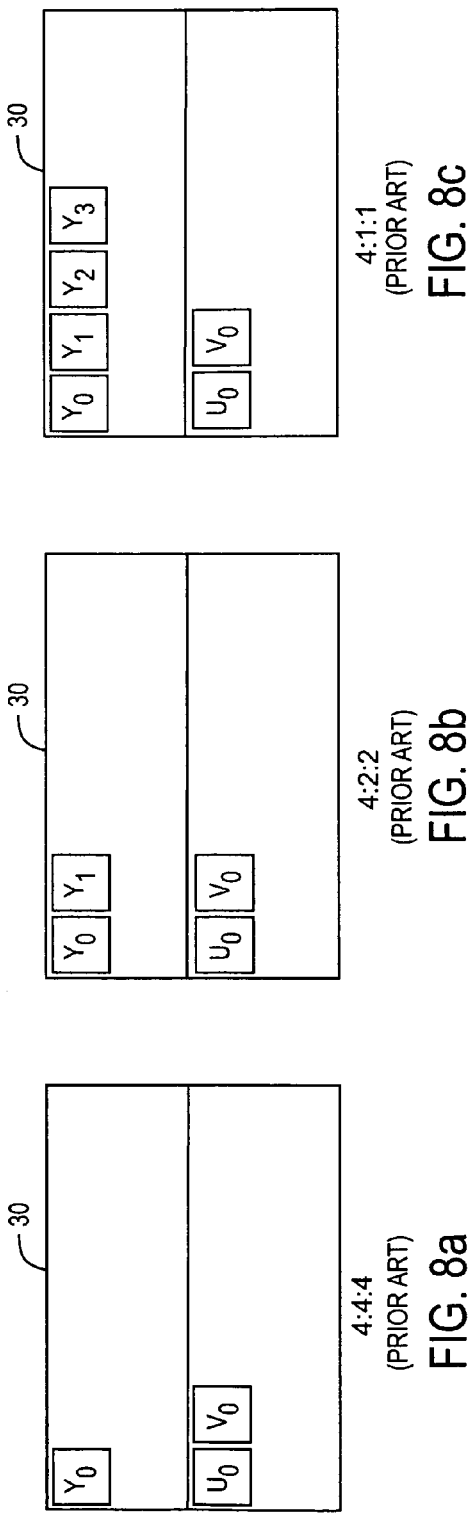
FIG. 8c (PRIOR ART) 4:1:1
FIG. 8b (PRIOR ART) 4:2:2
FIG. 8a (PRIOR ART) 4:4:4
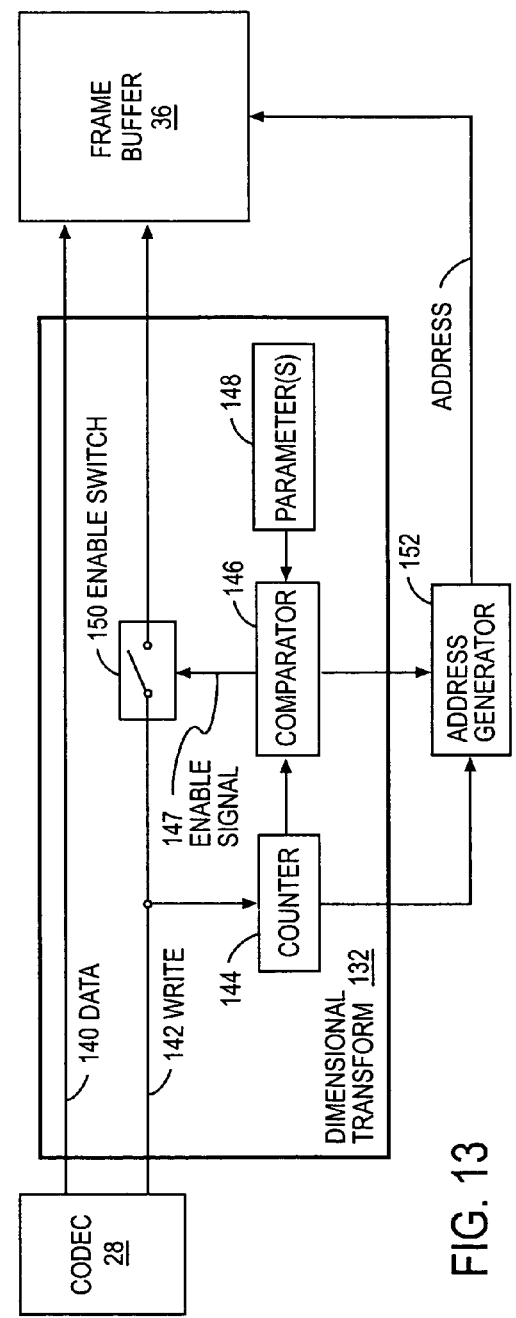
FIG. 13

| | | | | | |
|---|---|---|---|---|---|
| $Y_3$ | $Y_7$ | $Y_{11}$ | $Y_{15}$ | $U_{12}$ | $V_{12}$ |
| $Y_2$ | $Y_6$ | $Y_{10}$ | $Y_{14}$ | $U_8$ | $V_8$ |
| $Y_1$ | $Y_5$ | $Y_9$ | $Y_{13}$ | $U_4$ | $V_4$ |
| $Y_0$ | $Y_4$ | $Y_8$ | $Y_{12}$ | $U_0$ | $V_0$ |

| | | | | | |
|---|---|---|---|---|---|
| $Y_3$ | $Y_7$ | $U_6$ | $V_6$ | $Y_{11}$ | $Y_{15}$ |
| $Y_2$ | $Y_6$ | $U_4$ | $V_4$ | $Y_{10}$ | $Y_{14}$ |
| $Y_1$ | $Y_5$ | $U_2$ | $V_2$ | $Y_9$ | $Y_{13}$ |
| $Y_0$ | $Y_4$ | $U_0$ | $V_0$ | $Y_8$ | $Y_{12}$ |

| | | | | | |
|---|---|---|---|---|---|
| $Y_3$ | $U_3$ | $V_3$ | $Y_7$ | $U_7$ | $V_7$ |
| $Y_2$ | $U_2$ | $V_2$ | $Y_6$ | $U_6$ | $V_6$ |
| $Y_1$ | $U_1$ | $V_1$ | $Y_5$ | $U_5$ | $V_5$ |
| $Y_0$ | $U_0$ | $V_0$ | $Y_4$ | $U_4$ | $V_4$ |

METHOD AND APPARATUS FOR DIMENSIONALLY TRANSFORMING AN IMAGE WITHOUT A LINE BUFFER

FIELD OF THE INVENTION

The present invention relates generally to digital image processing, and particularly to a method and apparatus for eliminating a line buffer when dimensionally transforming block-interleaved decoded image data.

BACKGROUND

The term "computer system" today applies to a wide variety of devices. The term includes mainframe and personal computers, as well as battery-powered computer systems, such as personal digital assistants and cellular telephones. In computer systems, a graphics controller is commonly employed to couple a CPU to a display device, such as a CRT or an LCD. The graphics controller performs certain special purpose functions related to processing image data for display so that the CPU is not required to perform such functions. For example, the graphics controller may include circuitry for decompressing image data as well as an embedded memory for storing it.

Display devices receive image data arranged in raster sequence and render it in a viewable form. (A raster sequence begins with the left-most pixel on the top line of the array, proceeds pixel-by-pixel from left to right, and when the end of the top line is reached proceeds to the second line, again beginning with the left-most pixel, and continues to each successively lower line until the end of the last line is reached.)

In a display device, an image is formed from an array, often referred to as a frame, of small discrete elements known as "pixels." The term, however, has another meaning; pixel refers to the elements of image data used to define a displayed pixel's attributes, such as its brightness and color. For example, in a digital color image, pixels are commonly comprised of 8-bit component triplets, which together form a 24-bit word that defines the pixel in terms of a particular color model. A color model is method for specifying individual colors within a specific gamut of colors and is defined in terms of a three-dimensional Cartesian coordinate system (x, y, z). The RGB model is commonly used to define the gamut of colors that can be displayed on an LCD or CRT. In the RGB model, each primary color—red, green, and blue—represents an axis, and particular values along each axis are added together to produce the desired color. Similarly, pixels in display devices have three elements, each for producing one primary color, and particular values for each component are combined to produce a displayed pixel having the desired color.

Image data requires considerable storage and transmission capacity. For example, consider a single 512×512 color image comprised of 24-bit pixels. The image requires 786 K bytes of memory and, at a transmission rate of 128 K bits/second, 49 seconds for transmission. While it is true that memory has become relatively inexpensive and high data transmission rates more common, the demand for image storage capacity and transmission bandwidth continues to grow apace. Further, larger memories and faster processors increase energy demands on the limited resources of battery-powered computer systems. One solution to this problem is to compress the image data before storing or transmitting it. The Joint Photographic Experts Group (JPEG) has developed a popular method for compressing still images. Compressing the 512×512 color image into a JPEG file creates a file that may be only 40-80 K bytes in size (depending on the compression rate and the visual properties of the particular image) without creating visible defects in the image when it is displayed.

The JPEG standard employs a forward discrete cosine transform (DCT) as one step in the compression (or coding) process and an inverse DCT as part of the decoding process. Before JPEG coding, the pixels are commonly converted from the RGB color model to a $YC_RC_B$ model, in which Y is a brightness value, and $C_R$ (chrominance-red) and $C_B$ (chrominance-blue) are color difference values. The $YC_RC_B$ model is also referred to as the YUV model. In addition, the source image is separated into component images, that is, Y, U, and V images. In an image, pixels and their components are distributed at equally spaced intervals. Just as an audio signal may be sampled at equally spaced time intervals and represented in a graph of amplitude versus time, pixel components may be viewed as samples of a visual signal, such as brightness, and plotted in a graph of amplitude versus distance. The audio signal has a time frequency, whereas the visual signal has a spatial frequency. Moreover, just as the audio signal can be mapped from the time domain to the frequency domain using a Fourier transform, the visual signal may be mapped from the spatial domain to the frequency domain using the forward DCT. The human auditory system is often unable to perceive certain frequency components of an audio signal. Similarly, the human visual system is frequently unable to perceive certain frequency components a visual signal. JPEG coding recognizes that the data needed to represent unperceivable components may be discarded allowing the quantity of data to be reduced.

According to the JPEG standard, the smallest group of data units coded in the DCT is a minimum coded unit (MCU), which comprises three or more blocks. A "block" is an 8×8 array of "samples," a sample being one element in the two-dimensional array that describes a component. The samples in a block are arranged in raster order. User defined horizontal and vertical sampling factors are specified for each component image. If the sampling factors are specified so that every sample in a component image is selected for JPEG compression, the MCU comprises three blocks, one for each component. Commonly, however, the sampling factors are specified so that every sample in the Y component is selected, but only 50% or 25% of the samples in the U and V components are selected. In these cases, the MCU comprises four blocks and six blocks, respectively. The blocks for each MCU are grouped together in an ordered sequence, e.g. $Y_0U_0V_0$, the subscript denoting the block. The MCUs are arranged in an alternating or "interleaved" sequence before being compressed, and this data format is referred to herein as "block-interleaved."

When a JPEG file is received, it is normally decoded by a special purpose block of logic known as a CODEC (compressor/decompressor). The output from the decoding process is block-interleaved image data. As the CODEC is adapted to work in many different computer systems, it is not designed to output image data in any format other than the block-interleaved format. Display devices, however, are not adapted to receive block-interleaved image data; rather display devices expect pixels arranged in raster sequence. Moreover, operations performed by the graphics controller before the pixels are provided to the display, such as resizing and color space conversion, are adapted to be performed on raster ordered pixels.

In order that the image data can be operated on and provided to the display as raster ordered pixels, the output of the CODEC, that is, the block-interleaved image data, is normally stored as blocks in a memory commonly referred to as a line buffer. As the image data for any particular pixel is needed, three samples are fetched from each of the three blocks stored in various parts of the line buffer. The samples are assembled into pixels, processed, and stored in a memory, usually referred to as a display or frame buffer, in raster sequence. Pixels are then sequentially fetched from the frame buffer and provided to the display device.

The line buffer must be large enough to hold at least one display line. The reason is that the graphics controller is designed to operate on raster ordered data. Moreover, the line buffer generally must be large enough to hold at least two display lines. The reason is that one line is read from the line buffer while another is being stored by the CODEC. Because JPEG decoded block-interleaved data is made up of 8×8 blocks of samples, it is not possible to simple store a single line. Instead, the number of blocks needed to assemble a line must be stored. This is the same number as the number of blocks sufficient to store 8 lines. In other words, to store one line, the line buffer must be large enough to hold 8 lines. And to store two lines, it must be large enough to store 16 lines.

Because the line buffer must be able to hold at least 16 lines of image data, it requires a considerable amount of memory. Further, the line buffer in a graphics controller is a dedicated memory of predetermined size. As such, the maximum width of a source image that can be JPEG decoded is limited by the size of the line buffer. Thus, the only way to provide the flexibility for handling source images of varying size is to provide a line buffer that is large enough to hold the largest expected image width.

Because memory is expensive in terms of the physical space and the power it requires, and because it is undesirably inflexible to limit the size of images cable of being JPEG decoded to the width of the line buffer, a method and apparatus for eliminating a line buffer when receiving, transforming, and transferring block-interleaved decoded image data to a display would be desirable.

BRIEF SUMMARY OF THE INVENTION

The invention is directed to a method and apparatus for receiving a stream of block-interleaved image data and dimensionally transforming the image, which eliminates the need for a line buffer. The method comprises serially receiving the image in an ordered sequence of interleaved blocks. Each block comprises an ordered sequence of samples of the image, and the samples of a single block all corresponding to a single color component. The method includes counting the samples in the order received to determine a sequence number for each sample, comparing the sequence number with a set of predetermined values, and dimensionally transforming the image by either discarding the sample or storing the sample in a memory.

The apparatus comprises a data receiver, a counter, and a comparator. The data receiver is for serially receiving the image in an ordered sequence of interleaved blocks. Each block comprises an ordered sequence of samples of the image, and the samples of a single block all corresponding to a single color component. The counter is adapted for counting the samples in the order received to determine a sequence number for each sample. The comparator is adapted for comparing the sequence number with a set of predetermined values and dimensionally transforming the image by either discarding the sample or storing the sample in a memory depending on the result of the comparison.

The objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is a view of the cropped source image of FIG. 2 and a scaled image.

FIG. 4 is a view of a source image as a set of component images.

FIGS. 8a-c are diagrams of a line buffer memory for storing blocks according to various sampling formats.

FIG. 9 is a block diagram showing the arrangement of blocks in a JPEG file.

FIGS. 11a-c are diagrams of a frame buffer memory showing samples stored in an interleaved arrangement according to various sampling formats.

FIGS. 12a-c are diagrams of a frame buffer memory that show, respectively, how samples are arranged after a first, second, and third component block are stored.

FIG. 13 is a block diagram of the dimensional transform circuit of FIG. 10.

DETAILED DESCRIPTION OF A PREFERRED EMBODIMENT

Figure 1:
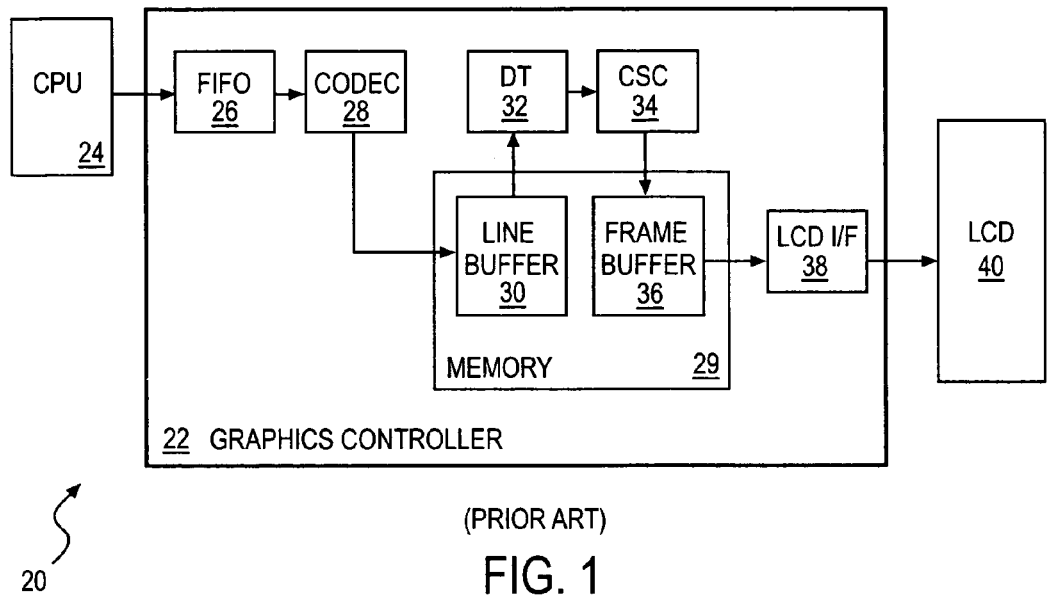
FIG. 1 is a block diagram of a computer system for decoding and displaying compressed image data.

The invention is directed to a method and apparatus for eliminating a line buffer when receiving, transforming, and transferring block-interleaved decoded image data to a display. Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a block diagram of a computer system 20 having a graphics controller 22 coupled to a CPU 24 and an LCD 40. FIG. 1 is but one preferred context for the invention. The graphics controller 22 includes a FIFO memory 26, used for buffering data received from the CPU 24, and a CODEC 28. In addition, the graphics controller 22 includes an embedded memory 29, part of which is set aside as a line buffer 30 and another part of which is set aside as a frame buffer 36. The graphics controller 22 also includes a dimensional transform circuit 32, a color space conversion circuit 34, and an LCD interface circuit 38.

By way of additional background, the transformation operations performed by dimensional transform circuit 32 and the format of the image data will be described before describing the operation of computer system 20.

Figure 2:
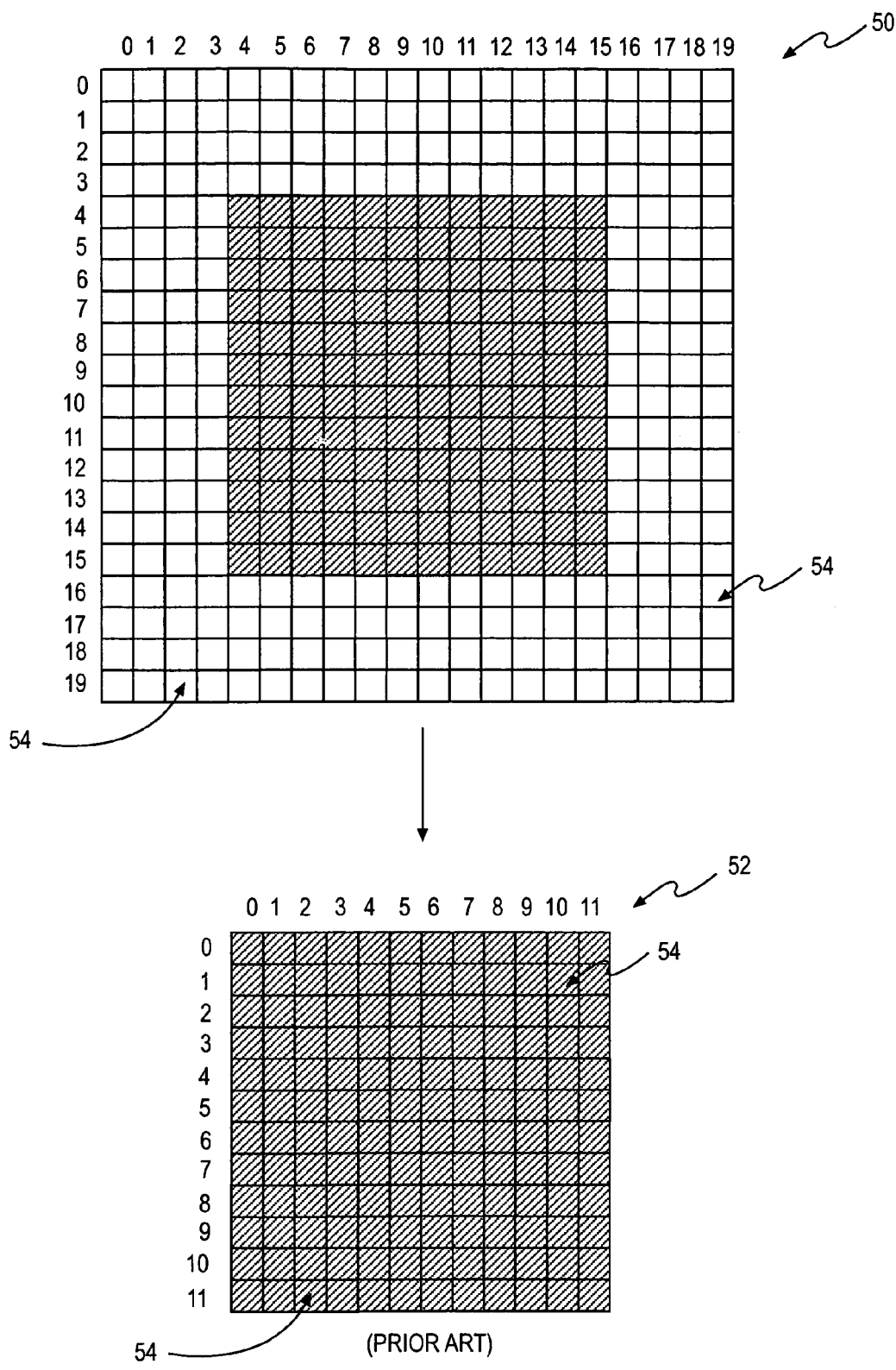
FIG. 2 is a view of a source image and a cropped source image.

Turning to FIG. 2, one dimensional transformation operation that may be performed on a frame before it is displayed on a display device is a cropping operation. An original frame 50 and a cropped frame 52 are illustrated in FIG. 2. Each frame comprises a plurality of pixels 54, each pixel being represented by a square. The coordinate position of a particular pixel 54 is given by the numbers along the top and left side of the frame. The amount by which an image is cropped is determined by a set of cropping parameters. Specifically, the cropping parameters define which areas are to be removed from the original frame 50 and may be specified in terms of coordinate values. For example, the cropping parameters may be start and stop pixels in the horizontal and vertical directions. For instance, if in the original frame 50 a distance equal to a four pixels is to be removed from the top, bottom, and each side of the frame, the coordinates of the start pixel are (4, 4) and that of the stop pixel are (15, 15).

FIG. 3 illustrates another dimensional transformation operation that may be performed on a frame before it is displayed. In particular, FIG. 3 shows a scaling operation. The amount by which an image is scaled is determined by a scale factor. For example, if the cropped frame 52 is to be reduced to one-fourth its original size, the scale factor is one-half. An image may be scaled using any one of a number of algorithms. When an image is scaled according to a simple linear algorithm using a scale factor of one-half, every other row of pixels 54 is discarded and every other pixel within a row is discarded. Scaling the cropped frame 52 using this linear algorithm and a scale factor of one-half produces the cropped and scaled frame 56. To illustrate the mapping of rows of pixels 54 and pixels within rows that are not discarded, FIG. 3 also shows the coordinates of two exemplary pixels ([2, 9] and [10, 3]) in frame 52 and the location of these pixels in the scaled frame 56. The phrase "dimensional transform" is used herein to refer operations that change the size of a frame either by cropping the frame, scaling it, or both. The term is intended to include any algorithm for cropping, scaling, and other similar operations that are now known or later become known in the art.

FIG. 4 shows a view of a frame of pixels that is believed to be helpful for understanding the context of the invention. As mentioned, the numeric value defining the attributes of an RGB pixel on a display device can be represented by a 3-byte word, one byte representing each color component. In FIG. 4, three component images 74 are shown, that is, all of the R components of the pixels are shown at their respective coordinate locations in an R frame, all of the G components are shown in a G frame, and all of the B components are shown in a B frame. Component images such as those shown in FIG. 5 are sometimes referred to as "pixel planes." Similar pixel planes may be formed with images represented in other color models, such as YUV.

Figure 5:
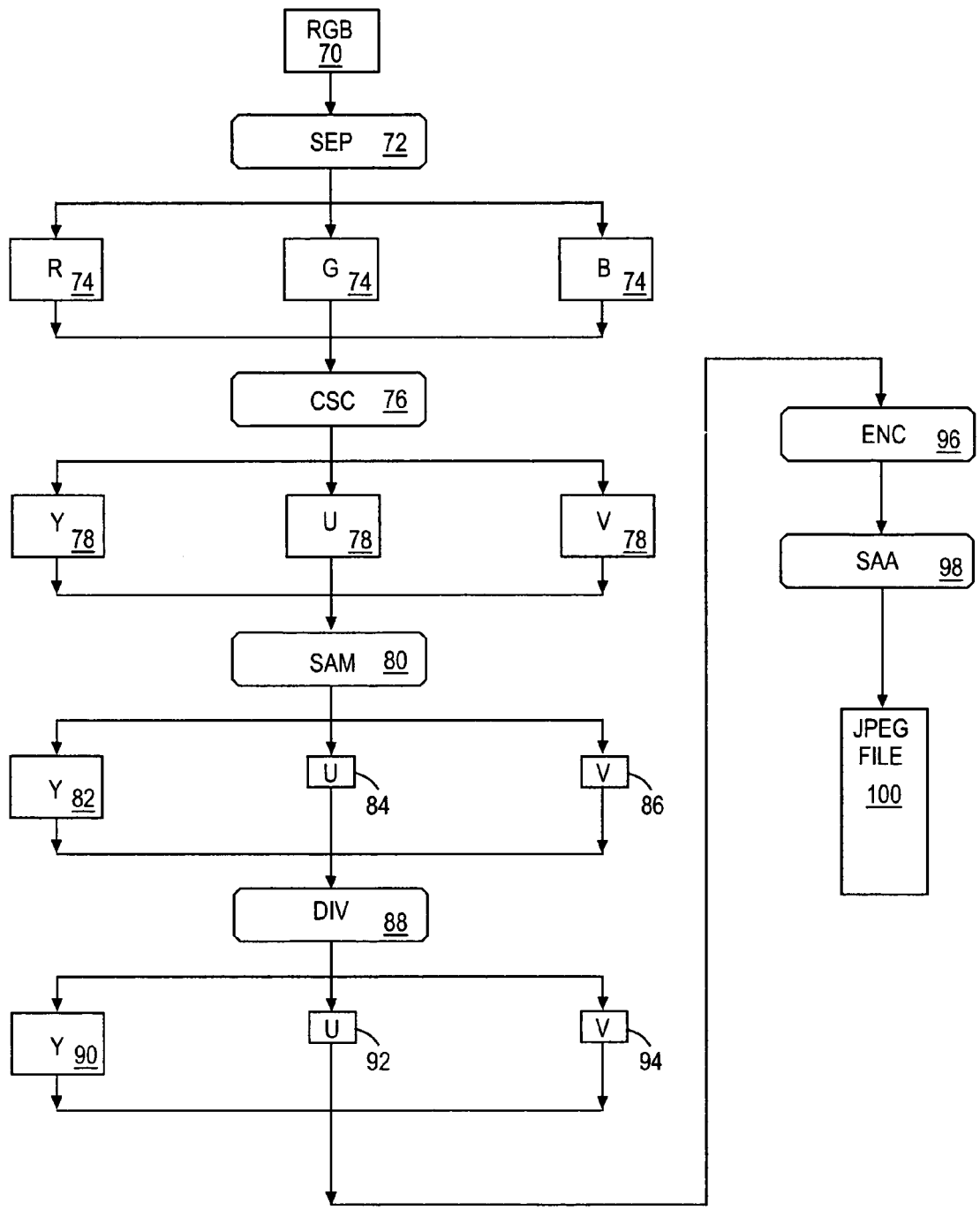
FIG. 5 is a block diagram illustrating the creation of a JPEG file.

FIG. 5 is a block diagram showing an overview of the creation of a JPEG file. Generally, the creation of a JPEG file begins with a source image 70 in RGB format. A first step 72 ("SEP") of separates the RGB image into R, G, and B component images 74. The component images 74 correspond to the pixel planes of FIG. 4 and one pixel plane 74 is created for each of the primary color components. The second step 76 ("CSC") converts the R, G, and B pixel planes 74 into Y, U, and V component images 78. In a step 80 ("SAM") of sampling, as further explained below, the Y, U and V pixel planes 78 are sampled.

Samples are selected from the component images according to predetermined selection schemes and sampling formats. For instance, if the sampling format is 4:4:4, then in each group of four consecutive pixels, four each of the Y, U, and V components are selected, respectively, from the Y, U, and V pixel planes. In other words, the 4:4:4 sampling format results in the selection of one hundred percent of the pixel components. If the sampling format is 4:2:2, one hundred percent of the pixel components of the Y components are selected, but only fifty percent of the U, and V components are selected.

Figures 6A, 6B, 6C:
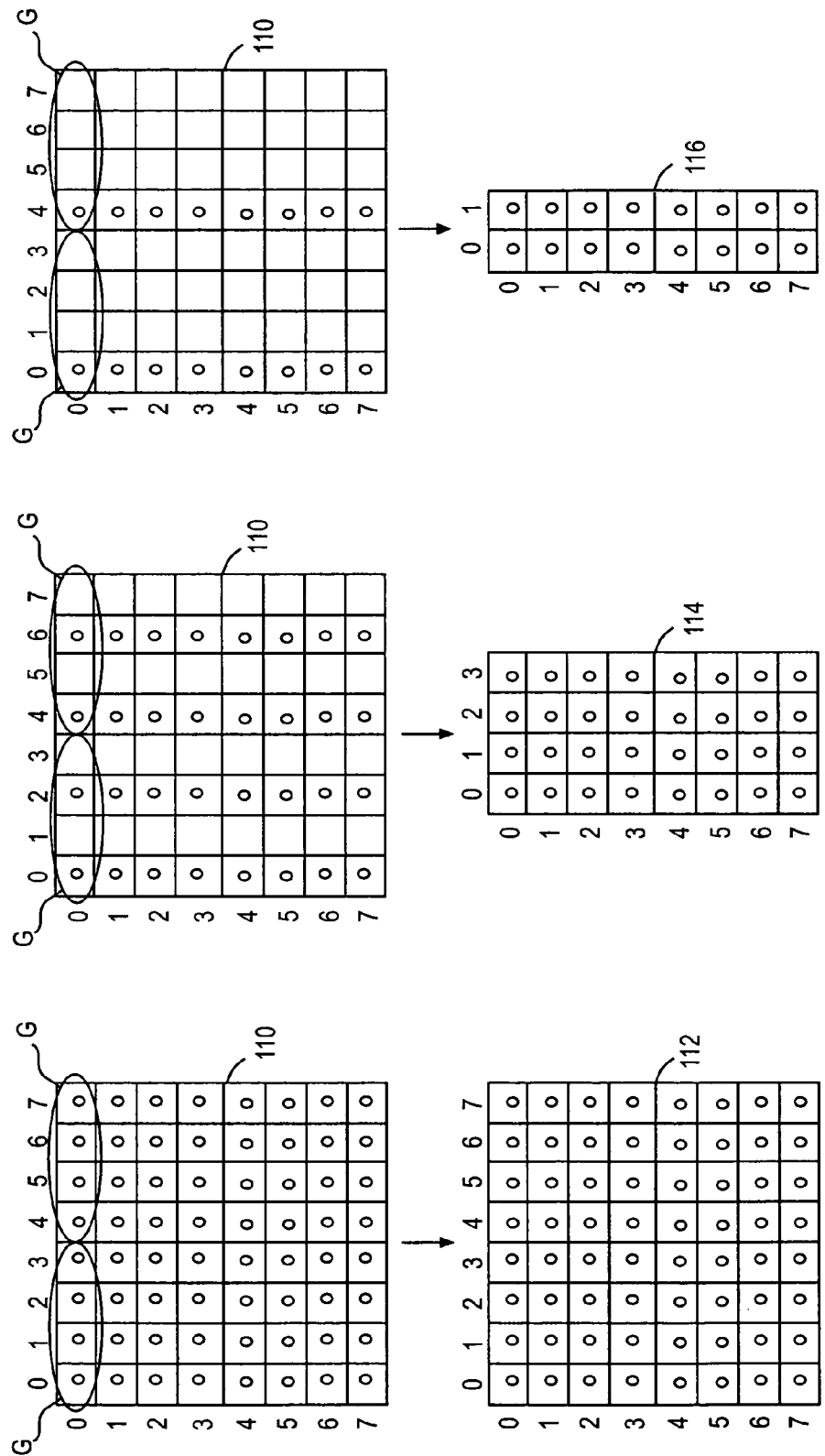
FIGS. 6a-c illustrate sample selection from a component image according to various sampling formats.

FIGS. 6a-c depicts blocks of samples and shows three exemplary schemes for selecting samples. The figures show, respectively, the selection of 100%, 50%, and 25% of the samples. FIGS. 6a-c show original blocks 110 before sampling, and collections of samples 112, 114, and 116 that result from sample selection. Each block 110 is an 8×8 matrix of samples of a particular component of a source image. Each sample location is represented by a square within the block, and a circle within the square indicates that the sample is selected for inclusion in the image data provided to the JPEG DCT process. A square which does not have a circle therein is not included in the DCT process, that is, it is discarded. In each block, each row consists of two groups G of four consecutive samples. In FIG. 6a, all of the samples in each group G of four are selected. In FIG. 6b, the first and third samples in each group G are selected. And, in FIG. 6c, only the first sample in each group is selected. Because blocks are 8×8, the collections of samples 114, and 116 are not large enough to form a block. These collections are combined with similar collections to create an 8×8 block.

Figure 7C:
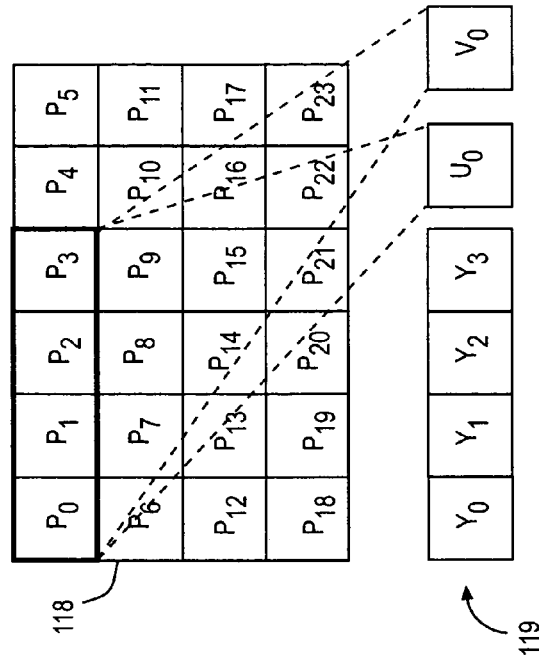
FIGS. 7a-c illustrate the mapping of samples from a source image to blocks.
Figure 7A:
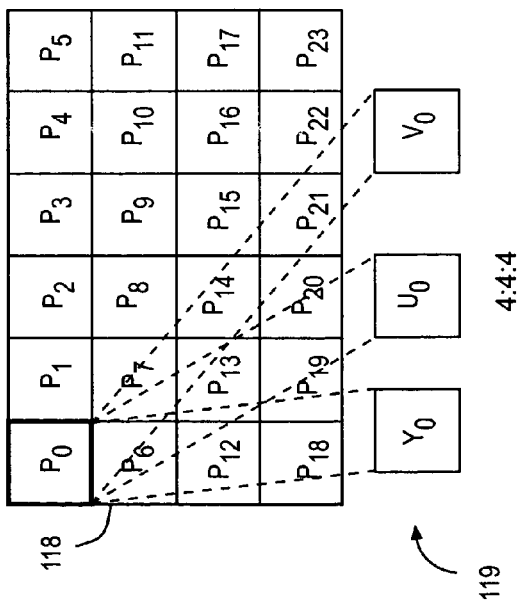
Figure 7B:
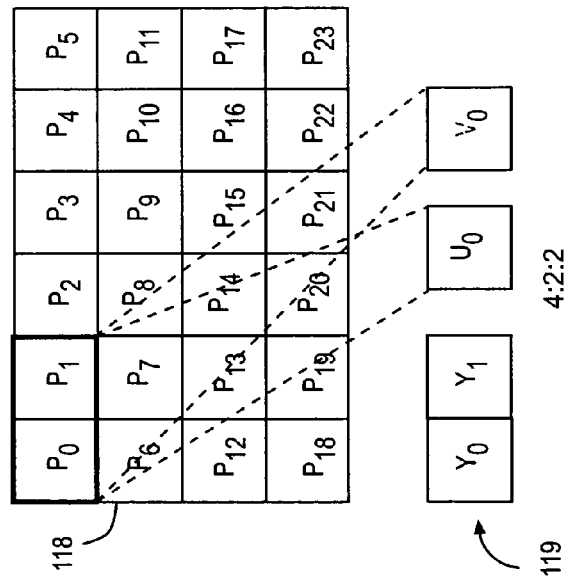

FIGS. 7a-c illustrate the way in which samples from a source image 118 are mapped into blocks 119. FIGS. 7a-7c show, respectively, the blocks created using exemplary sampling formats: 4:4:4, 4:2:2, and 4:1:1. The source image 118 consists of twenty-four 8×8 blocks of pixels. In FIG. 7a, the selection of samples from pixel block $P_0$ results in component blocks $Y_0$, $U_0$, and $V_0$. In FIG. 7b, the selection of samples from pixel blocks $P_0$ and $P_1$ creates, respectively, component blocks $Y_0$ and $Y_1$. In addition, the selection of samples from pixel blocks $P_0$ and $P_1$ together create an 8×8 block of U samples and an 8×8 block of V samples, i.e. $U_0$ and $V_0$ (this mapping is shown with dashed lines). In FIG. 7c, the selection of samples from pixel blocks $P_0$ to $P_3$ for Y components creates four blocks of Y. However, the selection of samples from these four pixel blocks for U and V components only creates one block of each type, i.e., $U_0$ and $V_0$ (this mapping is again shown with dashed lines). The smallest group of data units coded in a forward DCT is an MCU. In each figure, the blocks 119 form an MCU for the specified sampling format.

Referring again to FIG. 5, each block is JPEG encoded in a step 96 ("ENC"), that is, each block is separately compressed according to a JPEG method. In a step 98 ("SAA"), compressed blocks of pixel components are selected and arranged into a JPEG file 100.

FIG. 9 illustrates a JPEG file 100. In the JPEG file 100, the image data is block-interleaved and a 4:2:2 sampling format is employed. Blocks from the component images 90, 92, and 94 are arranged in a regular pattern. Specifically, the JPEG file 100 consists of two sequential blocks from the Y pixel plane 90, followed by one block from each of the U and V pixel planes 92, 94. This pattern is repeated until all of the blocks from all of the planes have been selected. It will be appreciated that if a different sampling format is used, the block-interleaved format will be modified accordingly.

Referring again to FIG. 1, the path that image data takes from JPEG file format to raster ordered pixels ready for display is described. In operation, the CPU 24 writes a JPEG file to the FIFO 26. It will be appreciated that the CPU 24 is an illustrative device; the JPEG file may be written by another device, such as a camera, a network interface, a memory controller, or any other device with data transfer capabilities. The CODEC 28 accesses the FIFO 26, decompresses the JPEG file using an inverse DCT-based process, and writes decoded block-interleaved image data to the line buffer 30.

FIGS. 8a-c illustrate one known way for storing decoded lock-interleaved image data in the line buffer 30. The FIGS. 8a-c illustrate the storing, respectively, of one MCU of 4:4:4, 4:2:2, and 4:1:1 block-interleaved image data. In the figures, the Y samples are stored in the first half of the line buffer 30, and the U and V blocks are stored in the second half. The dimensional transform circuit 32 requires a full row of pixels in order to begin its operation. While not shown in FIGS. 8a-c, a sufficient number of blocks are stored in the line buffer to form one full row of pixels. For example, a display having a width of 512 would require 64 MCUs to form one full row of pixels.

The dimensional transform (DT) circuit 32 reads the image data in the line buffer 30, assembles the samples into pixels, and after performing any desired dimensional transform operations, such as cropping or scaling, sends the pixels to the color space conversion (CSC) circuit 34. To obtain any particular pixel, the dimensional transform circuit 32 must fetch samples from two or more separated, scattered locations in the memory 30. The color space conversion circuit 34 converts the pixel data into the RGB format and stores it in the frame buffer 36 in raster order. The LCD interface circuit 38 reads pixels from the frame buffer 36 and presents them to the LCD 40 for display. It will be appreciated that the LCD 40 is an illustrative display device; a CRT or any similar device for rendering image data for viewing may be substituted.

Figure 10:
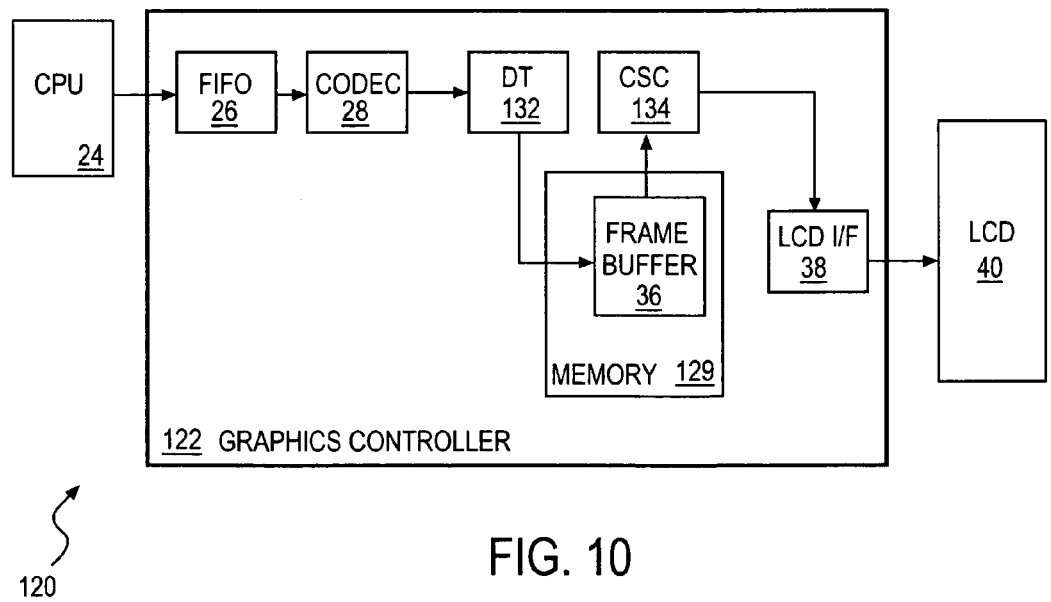
FIG. 10 is a block diagram of a computer system for decoding and displaying compressed image data, which includes a dimensional transform circuit, according to the invention.

Referring to FIG. 10, a block diagram of a computer system 120 having a graphics controller 122 according to the invention is illustrated. The graphics controller 122 is similar to the graphics controller 22, except that the dimensional transform circuit 132 is adapted to receive decoded block-interleaved image data from the CODEC, the color space converter 134 is adapted to fetch image data from the frame buffer 36, and the line buffer 30 is eliminated. Accordingly, the memory 129 is substantially smaller than the memory 29.

The dimensional transform circuit 132 crops or scales the image represented by the JPEG decoded block-interleaved data by under-sampling the image data. The CODEC 28 writes the Y, U, and V pixel components in block-interleaved format to the dimensional transform circuit 132. Unlike known dimensional transform circuit 32 which performs dimensional transform operations, on a pixel-by-pixel basis, the dimensional transform circuit 132 performs dimensional transform operations on a sample-by-sample basis.

The dimensional transform circuit 132 is shown in greater detail in FIG. 13. The DT circuit 132 includes a data receiver that includes, in a preferred embodiment, a data path 140 and a write path 142. The data path 140 is for receiving the stream of image data and presenting it to the frame buffer 36. Preferably, the data path 140 is one byte wide, though it may be any width. The data path 140 may include optionally an appropriate memory structure, such as a register, for temporary storage of data. The DT circuit also includes a write path 142 for receiving an indication from the CODEC 28 that it has output a new byte (or other unit) of image data onto the data path 140. The write path is coupled via an enable switch 150 to the frame buffer 36. A counter 144, which is preferably a byte counter is coupled to the write path 142 and is used to count incoming samples. The counter 144 assigns each sample a sequence number that enables the DT circuit 132 to determine what type of sample is received, as well as the row and column (x, y) coordinate position of the pixel associated with the sample. For example, when the count reaches 64, the DT circuit 132 recognizes that an entire 8×8 block of samples of one type of component has been received. The dimensional transform circuit 132 also uses the fact that the count has reached 64 to determine that the next component, that is, the $65^{th}$ byte, will be a component of a different type.

The dimensional transform circuit 132 also includes a comparator 146. The comparator 146 receives the output of the counter 144 and uses the computed (x, y) coordinate values of each sample to perform dimensional transform operations, such as cropping and scaling. Parameters used to define the cropping and scaling operation are preferably stored in parameter memory 148. The sequence number of a sample, or an equivalent (x, y) coordinate value, is compared to an appropriate parameter or parameters. (Typically, parameters are directly or indirectly selected prior to the dimensional transform operation by a user.) If the comparison indicates that the pixel associated with the sample is to be included in the dimensionally transformed image, the comparator generates a signal 147 to enable the write path 142. On the other hand, if the pixel is to be excluded from the image, the enable signal is not generated. The enable signal causes the enable switch 150 to close which in turn cause the write signal to be passed to the frame buffer. When the frame buffer receives the write signal, it stores the data present on the data path 140. If the frame buffer does not receive a write signal, it does not store the data on the data path which may then be overwritten with the next sample.

As one skilled in the art will readily appreciate, the write enable signal 147 and switch 150 may be implemented in a variety of ways. It will be appreciated, however, that while the enable signal and switch are one preferred embodiment, the invention of not limited to this particular implementation. Any hardware, software, or firmware that causes a sample to be stored or not stored in the frame buffer based on the result of comparing the sequence number (or coordinate value) provided by the counter 144 to a predetermined dimensional transform parameter is contemplated.

In addition, as also shown in FIG. 13, the count sequence or coordinate value of a sample may be used to determine where a particular data element in the data stream should be written to the frame buffer 36. The sequence number (or coordinate value) is also provided by the counter 144 to an address generator 144, which provides an address to the frame buffer specifying the memory location for storing the sample. In one preferred embodiment, the address generator 144 causes the Y, U, and V samples to be written so that they are interleaved in frame buffer, as shown in FIGS. 11a-c and 12a-c.

Figures 12A, 12B, 12C:
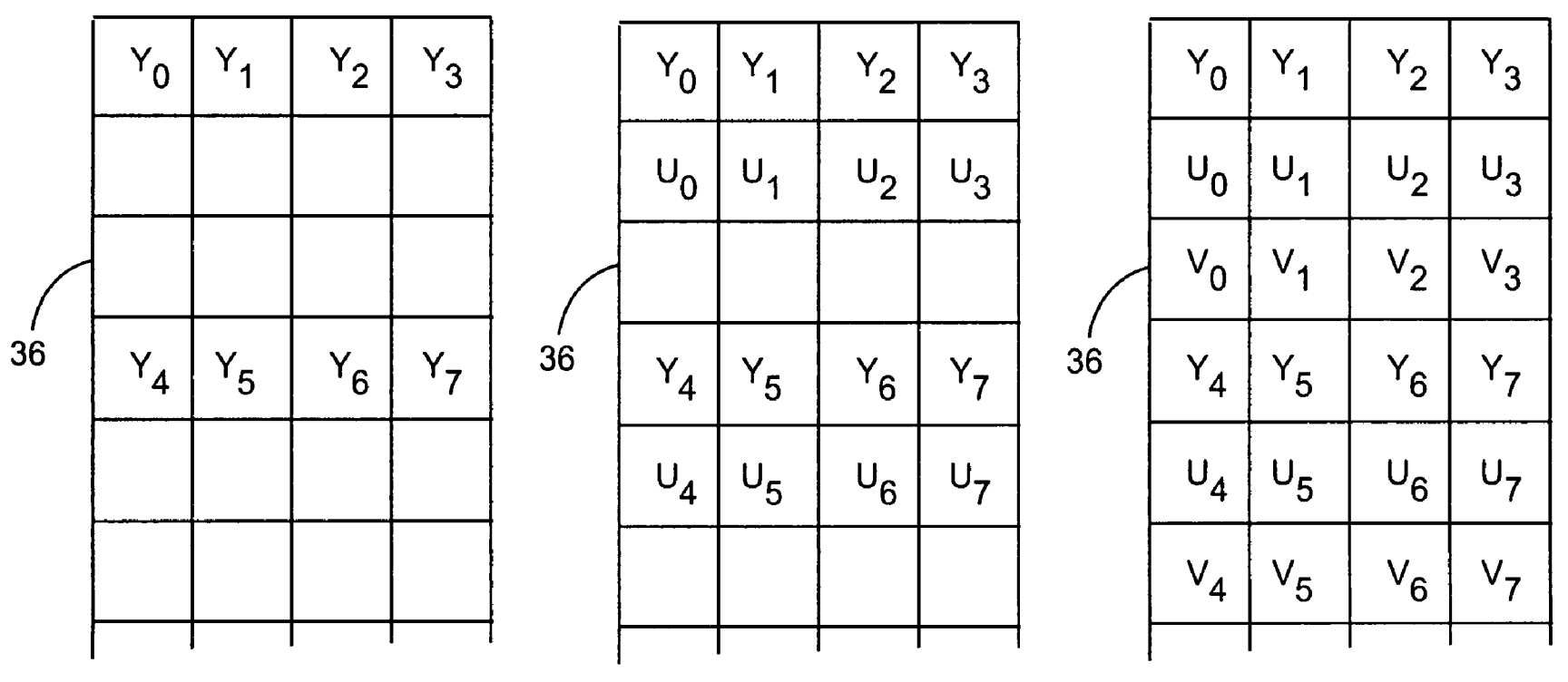

The way that samples are interleaved in memory will depend on the sampling format, and FIGS. 11a-c show, respectively, a portion of the frame buffer 36 for 4:4:4, 4:2:2, and 4:1:1. FIG. 12a shows how the memory looks after a Y block has been stored for a 4:4:4 sampling format. FIG. 12b shows how the memory looks after a U block has been stored. And, FIG. 12a shows how the memory looks after a V block has been stored. In summary, when the samples are interleaved in memory, the Y, U, and V samples for a particular group of pixels are stored at adjacent locations.

It is not essential, however, that the address generator 144 cause the Y, U, and V samples to be written so that they are interleaved in memory. In an alternative embodiment, the Y component blocks are written to a first portion (such as a first half) of the frame buffer 36 and the U and V component blocks to a second portion, such as shown in FIGS. 8a-c.

From the display buffer 36, the samples are fetched and arranged into pixels by the color space conversion circuit 134 ("CSC"). The color space conversion circuit 134 is adapted to fetch samples, arrange them into pixels, and convert the pixels from YUV to RGB. The color space conversion circuit 134 differs from the prior art circuit 34 in that it includes logic for fetching pixels. The form that this fetching logic takes will depend on how the dimensional transform circuit 132 writes the Y, U, and V samples to the frame buffer 36.

In a preferred embodiment, the color space conversion circuit 134 reads interleaved samples from memory locations in the same row. In this embodiment, the memory is preferably DRAM. As will be appreciated by one skilled in the art, in dynamic random access memory or DRAM, each stored bit must be refreshed must be refreshed every few milliseconds. In addition, each bit in a row must be precharged before it is read. Moreover, to read data stored at a particular location from a DRAM, the address must be sent in two clock cycles: first, a row-address-strobe (RAS) specifying the row is sent, and then a column-address-strobe specifying the column address is sent. Where the samples have been stored in interleaved memory locations in the same row, all of the samples needed for forming a particular pixel are stored in the same row. The storing of related samples in the same row takes advantage of the property of DRAM memory that it is not necessary to perform a pre-charge and generate RAS for each bit read from the same row. In particular, all of the samples for a pixel may be read without having to take the time to precharge and assert a RAS for each time a sample is read.

In an alternative embodiment, the color space conversion circuit 134 reads samples from Y, U, and V component blocks stored in memory from two or more locations in separated, scattered rows. In this alternative, the memory 129 may be DRAM or SRAM, depending on the timing requirements of the system. While this embodiment requires that the samples required to assemble a particular pixel be read from separate rows in memory, which in DRAM, requires a row pre-charge and a RAS for each sample read, it still provides the advantage that the samples may be stored in the frame buffer without a line buffer.

After fetching samples, forming pixels, and color converting the image data, the color space conversion circuit 134 is adapted to send the pixels to the LCD interface 38 in raster sequence.

In summary, the graphics controller 122 receives, dimensionally transforms, color space converts, and transfers block-interleaved image data to a display device without a line buffer. This saves the physical space and power that the line buffer requires, and provides the flexibility to decode for display JPEG images of any size.

In other preferred embodiments, principles of the invention are embodied in a method. According to the method, image data is serially received in an ordered sequence of interleaved blocks. Each block in the sequence itself comprises an ordered sequence of samples. The samples of a single block all corresponding to a single color component of the image. As the samples are received, they are counted, with each sample being assigned a sequence number. The sequence number is compared to one or more predetermined parameters that define the particular dimensional transformation. The image data is dimensionally transformed by selectively storing some of the image data in the frame buffer and discarding other of the image data. Whether a sample is stored depends on the result of the comparison. In other words, the determination of whether to store or discard a particular sample is made based on its position in the stream and the corresponding position in the source image. The image data may be stored as blocks in an SRAM or DRAM or it may be stored as interleaved samples in the same row of an SRAM. After the image data is stored, it is read from the frame buffer in such a way that pixels are assembled in raster sequence. The pixels are color converted from YUV to RGB. The pixels are then written in raster sequence to a display device.

In one preferred embodiment, a method incorporating the principles of the invention is embodied in a program of instructions. The instructions are stored on a machine-readable medium for execution by a machine to perform the method. Any machine-readable medium may be used.

The invention has been illustrated with MCUs according to the 4:4:4, 4:2:2, and 4:1:1 sampling formats. The invention in not limited, however, to these exemplary sampling formats. The principles of the invention are equally applicable to other sampling formats, such as 4:2:0. In addition, the invention has been described with respect to memory embedded in a graphics controller. It will be appreciated that the principles of the invention apply to a memory located off-chip.

The switch 150 performs a switching function for controlling the enable signal 147. The switch 150 may be replaced with a transistor or other similar solid state device or circuit for performing a switching function.

The invention has been illustrated with a comparator 146, a counter 144, and parameter memory 148, where the results of comparing the sequence number (or coordinate value) to a predetermined dimensional transform parameter determines whether a sample is to be stored or not. While this particular structure and these particular components are preferred, they are not critical to the invention. Any circuit or apparatus that performs the function of dimensionally transforming an image on a sample-by-sample basis and that uses the position of individual samples in a predetermined sequence to determine whether a particular sample is to be selected for storage in a memory is contemplated. For example, any circuit or apparatus that uses simple logic gates, as may be defined by a state machine, is contemplated. Similarly, a processor that uses any program of instruction to perform is contemplated.

The terms and expressions that have been employed in the foregoing specification are used as terms of description and not of limitation, and are not intended to exclude equivalents of the features shown and described or portions of them. The scope of the invention is defined and limited only by the claims that follow.

The invention claimed is:

1. A method for dimensionally transforming an image, comprising:
    (a) serially receiving the image in an ordered sequence of interleaved DCT blocks, each DCT block comprising an ordered sequence of samples of the image, the samples of a single DCT block all corresponding to a single color component;
    (b) counting the samples in the order received in step (a) to determine a sequence number for each sample;
    (c) comparing the sequence number determined in step (b) for each sample with a set of predetermined values for the sequence number; and
    (d) dimensionally transforming the image by either discarding the sample or storing the sample in a memory depending on the result of step (c); and
    wherein the step (d) of dimensionally transforming stores all of the samples for defining a pixel at interleaved addresses in the same row in the memory.

2. The method of claim 1, wherein the step (d) of dimensionally transforming crops the image.

3. The method of claim 2, further comprising (e) reading the stored said samples from the memory and (f) combining the samples into pixels.

4. The method of claim 3, wherein the step (f) further comprises selecting all of the samples read in step (e) corresponding to all of the color components for a single location in the image.

5. The method of claim 3, further comprising (g) converting the color format of the pixels.

6. The method of claim 1, wherein the step (d) of dimensionally transforming scales the image.

7. The method of claim 6, further comprising (e) reading the stored said samples from the memory and (f) combining the samples into pixels.

8. The method of claim 7, wherein the step (f) further comprises selecting all of the samples read in step (e) corresponding to all of the color components for a single location in the image.

9. The method of claim 8, further comprising (g) converting the color format of the pixels.

10. The method of claim 1, wherein the ordered sequence of interleaved blocks includes blocks in which the samples have been selected according to a 4:4:4 sampling format.

11. The method of claim 1, wherein the ordered sequence of interleaved blocks includes blocks in which the samples have been selected according to a 4:2:2 sampling format.

12. The method of claim 1, wherein the ordered sequence of interleaved blocks includes blocks in which the samples have been selected according to a 4:1:1 sampling format.

13. The method of claim 1, wherein the ordered sequence of interleaved blocks includes blocks in which the samples have been selected according to a 4:2:0 sampling format.

14. A computer-readable medium embodying a program of instructions executable by a computer to perform a method for dimensionally transforming an image, comprising:
   (a) serially receiving the image in an ordered sequence of interleaved DCT blocks, each DCT block comprising an ordered sequence of samples of the image, the samples of a single DCT block all corresponding to a single color component;
   (b) counting the samples in the order received in step (a) to determine a sequence number for each sample;
   (c) comparing the sequence number determined in step (b) for each sample with a set of predetermined values for the sequence number; and
   (d) dimensionally transforming the image by either discarding the sample or storing the sample in a memory depending on the result of step (c); and
   wherein the step (d) of dimensionally transforming stores all of the samples for defining a pixel at interleaved addresses in the same row in the memory.

15. The computer-readable medium of claim 14, wherein the step (d) of dimensionally transforming crops the image.

16. The computer-readable medium of claim 15, further comprising (e) reading the stored said samples from the memory and (f) combining the samples into pixels.

17. The computer-readable medium of claim 16, wherein the step (f) further comprises selecting all of the samples read in step (e) corresponding to all of the color components for a single location in the image.

18. The computer-readable medium of claim 16, further comprising (g) converting the color format of the pixels.

19. The computer-readable medium of claim 14, wherein the step (d) of dimensionally transforming scales the image.

20. The computer-readable medium of claim 19, further comprising (e) reading the stored said samples from the memory and (f) combining the samples into pixels.

21. The computer-readable medium of claim 20, wherein the step (f) further comprises selecting all of the samples read in step (e) corresponding to all of the color components for a single location in the image.

22. The computer-readable medium of claim 21, further comprising (g) converting the color format of the pixels.

23. An apparatus for dimensionally transforming an image, comprising:
   a data receiver for serially receiving the image in an ordered sequence of interleaved DCT blocks, each DCT block comprising an ordered sequence of samples of the image, the samples of a single DCT block all corresponding to a single color component;
   a counter for counting the samples in the order received for determining a sequence number for each sample; and
   a comparator for:
   comparing the sequence number determined for each sample with a set of predetermined values for the sequence number; and
   dimensionally transforming the image by either discarding the sample or storing the sample in a memory depending on the result of the comparison; and
   wherein the comparator causes all of the samples for defining a pixel to be stored at interleaved addresses in the same row in the memory.

24. The dimensional transform apparatus of claim 23, wherein the comparator crops the image.

25. The dimensional transform apparatus of claim 23, wherein the comparator scales the image.

26. A graphics controller comprising a dimensional transform apparatus, said dimensional transform apparatus comprising:
   a data receiver for serially receiving the image in an ordered sequence of interleaved DCT blocks, each DCT block comprising an ordered sequence of samples of the image, the samples of a single DCT block all corresponding to a single color component;
   a counter for counting the samples in the order received for determining a sequence number for each sample; and
   a comparator for:
   comparing the sequence number determined for each sample with a set of predetermined values for the sequence number; and
   dimensionally transforming the image by either discarding the sample or storing the sample in a memory depending on the result of the comparison; and
   wherein the comparator causes all of the samples for defining a pixel to be stored at interleaved addresses in the same row in the memory.

27. The graphics controller of claim 26, wherein the comparator crops the image.

28. The graphics controller of claim 27, further comprising a color space converter for reading the stored said samples from the memory and combining the samples into pixels.

29. The graphics controller of claim 28, wherein the color space converter is further adapted for selecting all of the samples read corresponding to all of the color components for a single location in the image.

30. The graphics controller of claim 28, wherein the color space converter is further adapted for converting the color format of the pixels.

31. The graphics controller of claim 26, wherein the comparator scales the image.

32. The graphics controller of claim 31, further comprising a color space converter for reading the stored said samples from the memory and combining the samples into pixels.

33. The graphics controller of claim 32, wherein the color space converter is further adapted for selecting all of the samples read corresponding to all of the color components for a single location in the image.

34. The graphics controller of claim 33, wherein the color space converter is further adapted for converting the color format of the pixels.

35. The graphics controller of claim 26, wherein the ordered sequence of interleaved blocks includes blocks in which the samples have been selected according to a 4:4:4 sampling format.

36. The graphics controller of claim 26, wherein the ordered sequence of interleaved blocks includes blocks in which the samples have been selected according to a 4:2:2 sampling format.

37. The graphics controller of claim 26, wherein the ordered sequence of interleaved blocks includes blocks in which the samples have been selected according to a 4:1:1 sampling format.

38. The graphics controller of claim 26, wherein the ordered sequence of interleaved blocks includes blocks in which the samples have been selected according to a 4:2:0 sampling format.

39. A computer system comprising a CPU, a display device, and a graphics controller, said graphics controller having an apparatus for dimensionally transforming an image, comprising:
   a data receiver for serially receiving the image in an ordered sequence of interleaved DCT blocks, each DCT block comprising an ordered sequence of samples of the image, the samples of a single DCT block all corresponding to a single color component;
   a counter for counting the samples in the order received for determining a sequence number for each sample; and
   a comparator for:
   comparing the sequence number determined for each sample with a set of predetermined values for the sequence number; and
   dimensionally transforming the image by either discarding the sample or storing the sample in a memory depending on the result of the comparison; and
   wherein the comparator causes all of the samples for defining a pixel to be stored at interleaved addresses in the same row in the memory.

40. The computer system of claim 39, wherein the comparator crops the image.

41. The computer system of claim 40, further comprising a color space converter for reading the stored said samples from the memory and combining the samples into pixels.

42. The computer system of claim 41, wherein the color space converter is further adapted for selecting all of the samples read corresponding to all of the color components for a single location in the image.

43. The computer system of claim 41, wherein the color space converter is further adapted for converting the color format of the pixels.

44. The computer system of claim 39, wherein the comparator scales the image.

45. The computer system of claim 44, further comprising a color space converter for reading the stored said samples from the memory and combining the samples into pixels.

46. The computer system of claim 45, wherein the color space converter is further adapted for selecting all of the samples read corresponding to all of the color components for a single location in the image.

47. The computer system of claim 46, wherein the color space converter is further adapted for converting the color format of the pixels.

48. The computer system of claim 39, wherein the ordered sequence of interleaved blocks includes blocks in which the samples have been selected according to a 4:4:4 sampling format.

49. The computer system of claim 39, wherein the ordered sequence of interleaved blocks includes blocks in which the samples have been selected according to a 4:2:2 sampling format.

50. The computer system of claim 39, wherein the ordered sequence of interleaved blocks includes blocks in which the samples have been selected according to a 4:1:1 sampling format.

51. The computer system of claim 39, wherein the ordered sequence of interleaved blocks includes blocks in which the samples have been selected according to a 4:2:0 sampling format.

* * * * *